United States Patent [19]

Joseph et al.

[11] 4,174,885
[45] Nov. 20, 1979

[54] FILTER ROTATOR FOR COHERENT OPTICAL CORRELATION SYSTEM

[75] Inventors: Bernard W. Joseph, Berkley; Aaron D. Gara, Rochester, both of Mich.

[73] Assignee: General Motors Corporation, Detroit, Mich.

[21] Appl. No.: 869,678

[22] Filed: Jan. 16, 1978

[51] Int. Cl.² .......................... G06G 9/00; G03H 1/16
[52] U.S. Cl. .................................. 350/162 SF; 356/71
[58] Field of Search ............... 350/162 SF, 3.83, 3.85, 350/3.86; 356/71

[56] References Cited

U.S. PATENT DOCUMENTS

| | | | |
|---|---|---|---|
| 3,511,571 | 5/1970 | Ogle | 356/71 |
| 3,666,359 | 5/1972 | Lee | 350/162 SF |
| 3,762,819 | 10/1973 | Myer | 356/71 |
| 3,822,087 | 7/1974 | Bolusset | 350/3.75 |
| 4,111,526 | 9/1978 | Joseph | 350/162 SF |

Primary Examiner—Ronald J. Stern
Attorney, Agent, or Firm—Warren D. Hill

[57] ABSTRACT

In a coherent optical correlation system for detection of object images at unknown angular orientations, a holographic spatial filter in the transform plane of the system is rotated until a correlation beam is produced. The spatial filter is mounted on a rotating cylinder which carries a first mirror placed in the path of the correlation beam emitted from the filter and disposed to direct the beam toward the axis of rotation of the cylinder and a second mirror on the axis and intercepting the beam for directing the correlation beam substantially along the axis. A motor drives the cylinder about its axis and an optical encoding device associated with the rotating cylinder provides an electronic indication of the cylinder orientation at any given instant.

2 Claims, 4 Drawing Figures

FILTER ROTATOR FOR COHERENT OPTICAL CORRELATION SYSTEM

This invention relates to coherent optical correlation and particularly to a spatial filter rotator for orienting the filter with an input image.

In the art of optical correlation, it is well known that nonsymmetrical input images must be properly oriented with respect to a spatial filter in order for a correlation beam to be produced. In systems where it has been necessary to utilize input images of unknown orientation, it has been the practice to angularly match the image transform to the spatial filter by rotating the input image either physically as by rotating a photographic transparency bearing the image or optically by an image rotator. Extreme care is required in such input image rotation because small motions caused by imperfections in the rotating equipment are greatly magnified in the output of the system by virtue of the location of the rotator at a substantial distance from the output of the system. It is preferred to rotate the holographic filter to achieve orientation with the input image since the filter being closer to the system output would inherently produce smaller motions in the output beam caused by any undesirable movements in the rotator. However, the correlation beam emitted from a holographic filter is projected at an angle from the optical axis of the system in a direction which depends upon the angular orientation of the filter at the moment correlation occurs. Since the direction of the correlation beam is not known in advance, the detection of that beam is made difficult.

It is, therefore, an object of this invention to provide in a coherent optical correlation system a filter rotator which optically projects the emergent correlation beam substantially along a fixed optical axis so that a detector system of small area in a preset location can be used to analyze the correlation beam position. Another object is to provide in such a filter rotator an angle encoder to provide a signal indicating at any given moment the angular orientation of the rotating filter.

The invention is carried out by providing a rotating cylinder positioned to rotate about the optical axis of the system and carrying a holographic filter for rotation about that axis. First and second mirrors mounted in the rotatable cylinder redirect the correlation beam emerging from the filter to a path substantially along the optical axis. An angle encoder associated with the rotating cylinder provides a continuous output signal indicating the orientation of the filter.

The above and other advantages will be made more apparent from the following specification taken in conjunction with the accompanying drawings wherein like reference numerals referred to like parts and wherein.

Figures 1, 2, 3, 4:
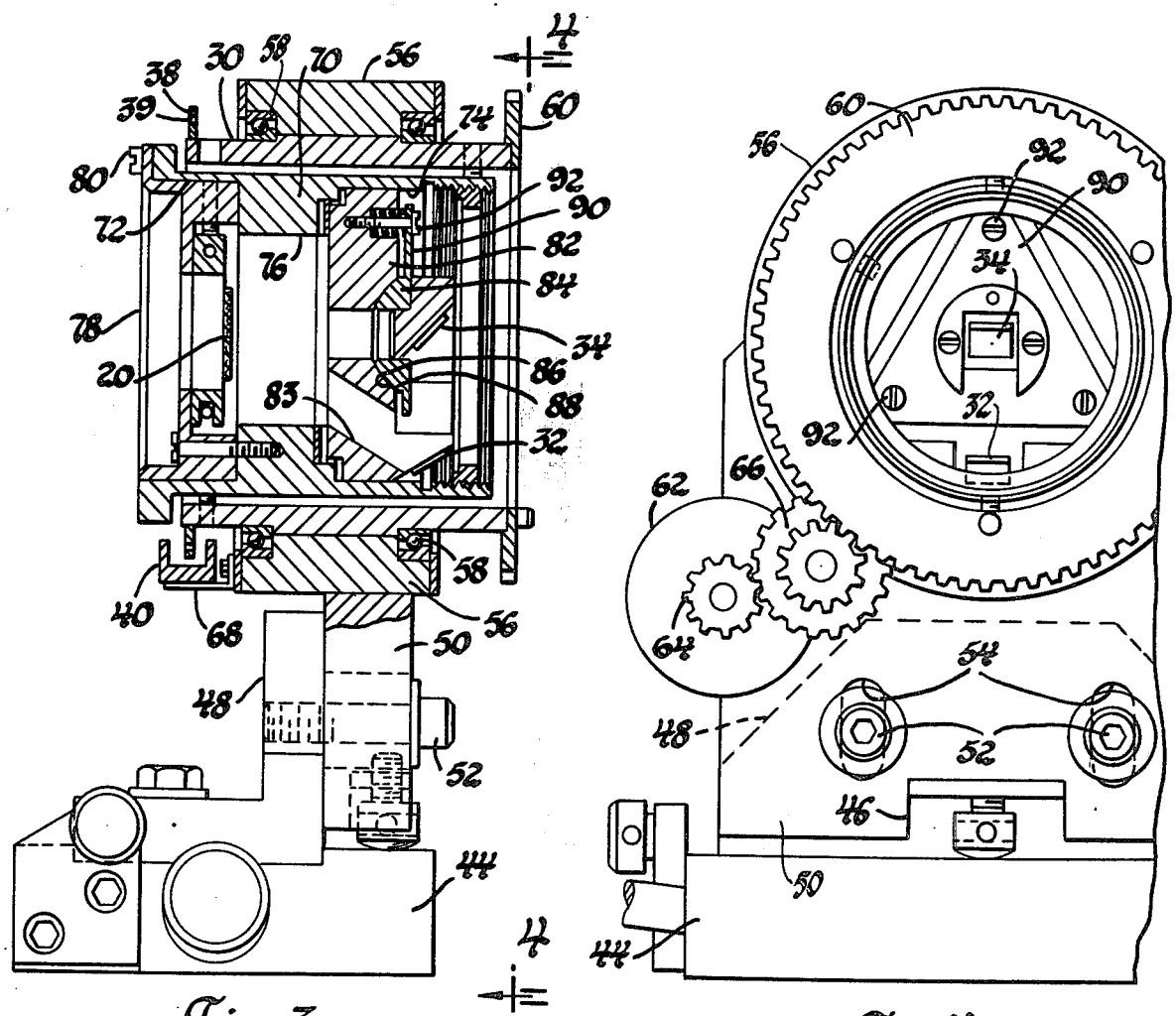
FIG. 1 is a schematic diagram of a system for coherent optical processing.
FIG. 2 is a schematic diagram of a system for coherent optical correlation including a filter rotator according to the invention.
FIG. 3 is a cross sectional elevational view of the filter rotator of FIG. 2.
FIG. 4 is an elevational view of the filter rotator taken along line 4—4 of FIG. 3.

Referring to FIG. 1, a photographic transparency 10 carrying an image 12 is illuminated by a coherent light beam 14 directed parallel to an optical axis 16 of the correlation system. The transparency 10 is located in the input plane $P_1$ or front focal plane of a spherical imaging lens or transform lens 18. The back focal plane or transform plane $P_2$ of the lens 18 contains a spatial filter 20 which preferably is a holographic spatial filter constructed from the Fourier transform of a master image or pattern. A second spherical lens 22, also centered on the optical axis 16, is positioned to receive a correlation beam from the spatial filter 20 and focus that correlation beam onto an output plane $P_3$ where the output signal appears as a small spot of light 23. As is well known, when the spatial filter 20 is illuminated by light representing the Fourier transform of an input image 12 which is substantially like the master pattern from which the filter was constructed, a correlation beam 24 will emerge from the spatial filter 20 provided the angular orientation of the filter properly corresponds to the orientation of the input image. It will be understood that the correlation beam 24 is not in actuality a line but rather is a beam of light 3 or 4 mm in diameter represented in the drawing by a ray 24. The correlation beam is at an angle 26 from the optical axis 16, the angle being substantially the same as that of the reference beam of coherent light used during construction of the hologram. If the filter 20 is rotated about the axis 16 in a search for an angle of correlation with the input image, the locus of possible correlation beam paths is a cone 24' generated by the ray 24 representing the correlation beam revolving about the axis 16. In such a system then the focusing lens 22 must be very large to subtend the range of the conical beam path and the resulting correlation spot would traverse a relatively large area of the plane $P_3$. Consequently, an elaborate detector system would be required to locate the correlation spot anywhere in that large area if automatic detection were used. Thus, the system of FIG. 1 would be too expensive and cumbersome for most practical applications.

The improved coherent optical correlation system shown in FIG. 2 utilizes the filter rotator according to the invention. The input transparency 10 illuminated by coherent light 14, the transform lens 18, and the spatial filter 20 are arranged along the optical axis 16. The filter 20 is carried by a rotatable cylinder 30 which carries first and second mirrors 32 and 34 respectively. The mirror 32 is positioned to intercept the correlation beam emitted from the filter 20. Although the beam is sweeping through a conical path as the filter 20 is rotated, the mirror 32 is likewise rotated so that the beam always is directed toward the mirror 32. That mirror directs the beam toward the optical axis 16. The mirror 34 is placed at the intersection of the axis 16 and the reflected beam 26 and is positioned to project the beam 26 generally along the optical axis 16. The correlation beam is not necessarily precisely centered on the optical axis because lateral shifts of the object image in the input plane cause corresponding small angular deviations in the correlation beam. Those deviations in the correlation beam result in lateral displacements of the correlation spot in the output plane $P_3$; thereby making possible the lateral location of the object image in the input plane by detecting the position of the correlation spot in the output plane. Since the correlation beam emitted from the filter rotator is substantially centered about the optical axis 16, a focusing lens 22 of reasonable size is adequate to subtend the beam and focus it onto the output plane. A detector or detector system 34 in the output plane is then used to determine the presence and the location of a correlation spot. An example of such a detector is a two dimensional photodiode array comprising a solid state camera having an electrical output indicative of the spot position and intensity.

An angle encoder on the rotatable cylinder 30 is used to provide electrical signals to enable determination of the orientation of the filter. The angle encoder includes a disk or wheel 38 surrounding the cylinder 30, the ring carrying a series of apertures along its circumference. An optoelectronic detector 40 straddles the encoder wheel 38 and emits output pulses corresponding to the passage of each aperture past the detector 40. The electrical signals from the detector 40 and the electrical signals from the detector system 36 are fed to an electrical processor 42 which correlates the filter orientation angle data with the correlation spot position data to provide an appropriate output signal.

A detailed illustration of the filter rotator is provided in FIGS. 3 and 4. A base 44 carries a precision machined slideaway 46 upon which a support bracket 48 is adjustably mounted to allow controlled movement of the filter rotator in the direction of the optical axis. A similar sliding adjustment perpendicular to the optical axis is provided in the base 44 although the details are not shown. A mounting plate 50 is secured by bolts 52 to a vertical leg of the support bracket 48, the bolts 52 passing through vertical slots 54 in the plate 50 to allow vertical adjustment of the plate 50. An annular bearing housing 56 including a pair of antifriction bearings 58 is mounted atop the plate 50. The housing 56 and bearings 58 entirely surround the rotatable cylinder 30 and a ring gear 60 supported at one end of the cylinder 30 is driven by an electric motor 62 through a pinion 64 and reducing gear 66. The motor 62 is carried by the plate 50. The opposite end of the rotatable cylinder 30 carries the encoding wheel 38 containing the apertures 39. The photoelectric detector 40 which straddles the code wheel 38 is supported by a bracket 68 on the bearing housing 56.

The cylinder 30 contains a cylindrical insert 70 having large diameter coaxial bores 72 and 74 at each end and an interconnecting bore 76 of smaller diameter. A filter holder assembly 78 is secured in the bore 72 by fasteners 80 and supports the spatial filter 20. A mirror mount 82 is secured within the cavity 74. Mirror 32 is fixed in a position near the wall of the cavity 74. An oblique passage 83 in the mount 82 and the bore 76 provide an unobstructed path for the correlation beam between the filter 20 and the mirror 32. The mirror 32 is placed at an angle to reflect the correlation beam along a path perpendicular to the axis of rotation of the cylinder 30. An adjustable platform 84 for carrying the mirror 34 has a spherical base portion 86 seated in a mating socket 88 formed in the mount 82. The platform includes a triangular plate 90 adjustably secured near each corner to the mount 82 by threaded fasteners 92. Thus by adjusting the platform 84 the mirror 34 is angularly set to aim the correlation beam generally along the axis of rotation.

It will thus be seen that the filter rotator according to this invention makes it possible to angularly orient a spatial filter with the transform of an input image without introducing errors which are greatly magnified in the output by virtue of the position of the filter relatively near the output plane. Further the subject filter rotator enables the system to maintain a small deviation in the correlation beam path so that a relatively small second transform lens is sufficient and the output spot detector can be simple and relatively small.

The embodiments of the invention in which an exclusive property or privilege is claimed are defined as follows:

1. In a coherent optical correlation system having means to produce an input image in a plane intersecting an optical axis, means to produce a spatial transform of the image, and a hologram filter to be angularly oriented about said axis in relation to the spatial transform of the image wherein the hologram filter when properly oriented and exposed to the spatial transform of the image emits a correlation beam at a predetermined angle to the hologram filter and at an angle to the optical axis of the system, a filter rotator for angularly moving the filter about said axis comprising a housing rotatable about the optical axis and carrying the hologram filter for rotation therewith, a first mirror carried by the housing at an off-axis location for intercepting the correlation beam projected from the filter, the mirror being oriented to direct the correlation beam along a path intersecting the optical axis, and a second mirror carried by the housing at the location where the correlation beam intersects the axis and positioned to direct the correlation beam substantially along the axis.

2. In a coherent optical correlation system having means to produce an input image in a plane intersecting an optical axis, means to produce a spatial transform of the image, and a hologram filter to be angularly oriented about said axis in relation to the spatial transform of the image wherein the hologram filter when properly oriented and exposed to the spatial transform of the image emits a correlation beam at a predetermined angle to the hologram filter and at an angle to the optical axis of the system, a filter rotator for angularly moving the filter about said axis comprising a housing rotatable about the optical axis and carrying the hologram filter for rotation therewith, motor means drivingly engaging the housing for effecting rotation thereof, angle encoder means comprising a code wheel mounted on said housing for rotation therewith and a stationary sensor means for detecting the angular position of the code wheel and producing a signal indicative of the spatial filter orientation, a first mirror carried by the housing at an off-axis location for intercepting the correlation beam projected from the filter, the mirror being oriented to direct the correlation beam along a path intersecting the optical axis, and a second mirror carried by the housing at the location where the correlation beam intersects the axis and positioned to direct the correlation beam substantially along the axis.

* * * * *